(12) United States Patent
Feldstein et al.

(10) Patent No.: US 6,959,599 B2
(45) Date of Patent: Nov. 1, 2005

(54) LEVEL DETECTOR FOR STORAGE TANKS FOR FLUIDS

(76) Inventors: Robert Feldstein, 57-47th St., Maspeth, NY (US) 11378; Donald Edward Hewson, 350 Burnhamthorpe Road West Suite #402, Mississauga, Ontario (CA) L5B 3J1; Joseph Rait, 2201-3rd Ave., Apt. 2604, Seattle, WA (US) 98121

( * ) Notice: Subject to any disclaimer, the term of this patent is extended or adjusted under 35 U.S.C. 154(b) by 121 days.

(21) Appl. No.: 10/411,343

(22) Filed: Apr. 10, 2003

(65) Prior Publication Data

US 2004/0200277 A1 Oct. 14, 2004

(51) Int. Cl.⁷ ............................................. G01F 23/00
(52) U.S. Cl. ............... 73/304 R; 73/304 R; 73/290 R; 73/292; 73/295; 340/622
(58) Field of Search .................. 73/304 R, 290 R, 73/292, 295; 340/622

(56) References Cited

U.S. PATENT DOCUMENTS

| | | | |
|---|---|---|---|
| 3,145,567 A | * | 8/1964 | Bobrowsky .................. 73/295 |
| 3,399,568 A | * | 9/1968 | Wilson ........................ 73/295 |
| 3,479,875 A | * | 11/1969 | Riddel ......................... 73/295 |
| 3,696,675 A | | 10/1972 | Gilmour |
| 4,129,848 A | * | 12/1978 | Frank et al. .................. 73/295 |
| 5,323,652 A | | 6/1994 | Parker |
| 5,707,590 A | | 1/1998 | Thomas et al. |
| 6,098,457 A | * | 8/2000 | Poole .......................... 73/295 |

FOREIGN PATENT DOCUMENTS

CA 1177281 6/1984

* cited by examiner

*Primary Examiner*—Hezron Williams
*Assistant Examiner*—André K. Jackson
(74) *Attorney, Agent, or Firm*—Lawrence E Laubscher, Jr.

(57) ABSTRACT

A level detector for storage tanks for fluids comprises a microprocessor, a network of resistive elements connected in series or parallel, and a plurality of conductive elements between them, connected across a power source. The resistive elements have a high temperature coefficient, and are heated by passing a high electric current through them, after which a low electric current is passed through them and the voltage between them is sampled by the microprocessor. The resistive elements lose heat through conduction, so that a pair of resistive elements can be detected having differential cooling between them as a consequence of being adjacent to the void within the tank or the fluid within the tank. Thus, an approximation of the fluid level within the storage tank can be determined and signalled remotely.

7 Claims, 1 Drawing Sheet

LEVEL DETECTOR FOR STORAGE TANKS FOR FLUIDS

FIELD OF THE INVENTION

This invention relates to fluid level measuring devices, and particularly to level detectors or indicators for storage tanks for fluids. The invention particularly relates to level detectors which can function remotely, which are electrical or electronic in nature, and which do not rely on a visual indication so as to determine the level of fluid in a storage tank. The present invention relates to external level indicators which determine the level of the interface between a fluid—typically a liquid—and the void volume above the fluid within a storage tank.

BACKGROUND OF THE INVENTION

Liquid level measuring devices have been known for many years. Their purpose is to locate the level of a flowable material, or to indicate the amount of flowable material remaining in a container.

On many occasions, monitoring the amount of flowable material in a container is required. However, direct observation of the flowable material level is not always possible or practical. Measurement of the material in such containers as pressurized cylinders, sealed containers, cryogenic flasks, and opaque vessels is often difficult. Such measurements are even more troublesome when the material within the container is corrosive or potentially toxic or flammable.

Sight glasses and weight scales are some examples of liquid level measuring devices which are commonly employed. Both of these devices suffer from a number of disadvantages. Sight glasses are expensive, and they can crack and break easily. On such occasions where the container is placed outdoors, ultraviolet light can cause the glass to haze. Weight scales are also expensive, and in many instances, measurements provided by weight scales are inexact.

A simple, economical external liquid level gauge which permits a direct reading of the level of a flowable material is taught in RAIT Canadian Patent No. 1,177,281 issued on Nov. 6, 1984. The liquid level measuring device taught therein employs one thermochromatic material which is coated onto a base layer. The base layer is magnetically mounted to the outside surface of the outside wall of the container, and thus the external liquid level gauge can be repeatedly removed and replaced or relocated when necessary.

The theory is that the rate of heat transfer is different between a mass of flowable material and the void volume above it such that for any container with a modest heat conducting capability, the container wall experiences a temperature gradient which is most pronounced at the interface of the contents with the void volume above the contents, and of course below that interface. That is to say, the rate of heat transfer through the wall of a container will be greater where there is a mass of flowable material located in the container than where there is a void volume above the flowable material. In other words, the rate of heat transfer through the container wall changes most abruptly at the level of the interface, and below. Thus, with the use of a thermochromatic material, a vivid color change occurring at the interface, and below, will permit an observer to obtain a direct reading of the level of the flowable material within a container by discerning where the interface is located.

RAIT U.S. patent application Ser. No. 10/077,971 filed Feb. 20, 2002, for "External Liquid Level Gauge," teaches an external liquid level gauge which is adapted to be affixed vertically to the outside wall of a container. The external liquid level gauge as taught therein is in the form of an elongated strip and it comprises a layer of base material and a layer of thermochromatic materials. Furthermore, the thermochromatic layer comprises a light absorbing background and at least two regions of thermochromatic materials which are arranged upon the light absorbing background. The regions of at least two thermochromatic materials are disposed in arrays thereof and are arranged entirely along the length of the external liquid level gauge. Moreover, each of the thermochromatic materials responds chromatically within a different operating temperature range.

Several other prior art thermochromatic external liquid level gauges are now described. They include GILMOUR U.S. Pat. No. 3,696,675 issued Oct. 10, 1972, which teaches an external liquid level gauge adapted to be permanently affixed to the outside wall of a container for determining the liquid-gas interface within the container. The external liquid level gauge described therein consists of a uniform thermochromatic liquid crystalline material which coats the entire base layer of the gauge such that it is at right angles to the liquid-gas interface. The uniform thermochromatic material covers the entire temperature range to which the container is subjected within an overall range of −20° C. to 250° C. Depending upon the thermochromatic material selected, color changes over a gradient from violet to red can occur in a range from as small as 2° C. to one as broad as 150° C. Since the temperature differential across the liquid-gas interface is generally small, on the order of less than 2° C., the change in color is slight across the interface. This is particularly the case when the container is placed outdoors and a large temperature range needs to be covered. As a result, it is difficult to visually locate the liquid-gas interface.

In U.S. Pat. No. 5,323,652 issued Jun. 28, 1994 to PARKER, the inventor teaches a thermochromatic level indicator for determining the level of a material inside a container. The thermochromatic level indicator includes at least two thermochromic materials of different opacities and transition temperature. Prior to the attachment of the thermochromatic level indicator to the outside surface of the outside wall of the container, the thermochromic materials are applied to a transparent film by silk screening, other printing and coating methods, or methods which employ the use of microencapsulated thermochromic materials. The thermochromatic level indicator may be permanently adhered to the container wall or it may be adhered to a magnetic strip which can be temporarily affixed to the container wall.

In another U.S. Pat. No. 5,707,590, issued Jan. 13, 1998, the inventor THOMAS et al has provided a detergent container with a thermochromatic level indicator. In one embodiment of the invention, the thermochromatic substance is added to the container's plastic material during the molding process. In another embodiment of the invention, the level indicator or strip comprises a base material, such as Mylar, which is coated or embedded with a thermochromatic substance by such methods as painting, stripping, or screen printing.

However, many occasions arise where it is not convenient or impractical to go to the site where a storage tank or tanks are located, and in which fluid—usually a liquid such as liquid gases including propane and the like—may be stored. For example, large storage tanks may be remotely located to supply heating fuel to likewise remotely located automatic weather stations, livestock shelters, storage depots, and the like. Those locations are typically accessible by road, rail, floating tank vessels, or helicopter, to replenish the supply of fuel, but the timing of such refuelling visits may not necessarily be periodic. That is, the vagaries and requirements of weather and climate may result in more or less consumption of fuel, and faster or slower exhaustion of the fuel supply. Obviously, it is not economical to visit a remote site for refuelling purposes if the storage tank for the fuel has only been exhausted by, say, 25% of its capacity. Equally obviously, a refuelling visit must be made before total exhaustion of the fuel supply at the remote location.

Accordingly, it is desirable to provide a level detector for storage tanks for fluids that can be remotely operated, or at least that can function and provide data indicative of the level of fluid storage in a storage tank without on-site human intervention. Accordingly, any level indicator which relies on a visual indication is not at all useful. Moreover, it is the intent and purpose of the present invention to provide level detectors for storage tanks and the like which are external, and therefore do not rely on float and valve assemblies and the like, and which can therefore also be applied to a wide variety of storage tank structures.

The present invention is intended to function so as to provide an approximation of the fluid level within a storage tank. As will be seen, particularly when remote storage tanks are considered, it is unimportant to be exact, provided that an approximation to within at least a few percent of the actual fluid level within the storage tank can be arrived at.

The inventors herein have unexpectedly discovered that it is quite possible to take advantage of the theory of the rate of heat transfer being different between a fluid such as a liquid, and the void volume above it, for any container which has at least a modest heat conducting capability, where such theory may be exploited remotely as a consequence of the use of elements or material which have high temperature coefficients. Moreover, the present inventors have unexpectedly determined that by appropriate spacing of heating elements vertically along the wall of a storage tank, and by applying appropriate sampling techniques to determine the difference between the rate of heat loss by conduction from various previously heated elements arranged vertically along a storage tank wall, a quite reasonable approximation of the fluid level within the storage tank can be determined.

All of this is possible because elements and materials exist that do, indeed, have appropriate high temperature coefficients; and because remote control of sampling and data communication is easily achievable.

For example, a remote location might, indeed, be connected at least by wire or wireless means into a network, a specific URL, wireless radio identity, mobile or cellular telephone number, or other electronic identity, so that it may be polled from time to time. Such polling would instruct that a level detection procedure should proceed alternatively, or as well, any remote location can be set up and programmed so that it will, on its own, periodically "wake up" and perform a level detection procedure as described hereafter.

By the provision of battery operated electronic and electrical apparatus, the present inventors have been able to provide a level detector for storage tanks for fluids that is remotely located, and which may function periodically or on demand, requiring visits to the remote location only when it is necessary to refill the storage tank. Typically, the battery life of batteries that are on site at the remote location is designed and expected to be much greater than the anticipated interval between refilling visits, but nonetheless the batteries can be exchanged for new ones each or every few refilling visits since the cost of replenishing a battery is minuscule when compared to the cost of refilling the storage tank.

Accordingly, by being able to monitor the differential cooling of the wall of a storage tank as a consequence of the difference in thermoconductivity and heat capacity of the fluid, typically a liquid, within the tank as opposed to the gas in the void above the fluid level within the tank, level detection is relatively easily achieved in keeping with the concepts and principles of the present invention.

Essentially, the present invention provides for a network of resistive elements, each having a high temperature coefficient, to be placed in a series or parallel connection across a high power source and to be heated by passing a relatively high current through the resistive elements. Then, a relatively low current may be passed through the same network of resistive elements, by employing a low power source, so that the power delivered to the network of resistive elements is lower than that which would cause additional heating effect of the resistive elements, but is sufficient to permit voltage detection at low resistivity, conductive elements between the resistance elements.

In other words, during a detection procedure after a heating step, the network of resistive elements can be considered to be effectively a voltage divider because the resistive elements which are below the level of the fluid within the tank will lose heat by conduction more quickly to the fluid than will the resistive elements that are above the level of fluid within the tank. Thus, their resistance will either decrease or increase at a commensurately greater rate, depending on whether or not the resistive elements have a positive temperature coefficient or a negative temperature coefficient.

It is recognized that the wall of the tank is, itself, heat conductive. However, if there are localized areas of heat that are arranged vertically along the wall of the tank, then each of those localized areas of heat will lose heat due to a combined effect of heat conduction as a consequence of the heat conduction characteristic and capacity of the wall of the tank per se, plus the heat conduction characteristics of the fluid or gas which is located at the same horizontal level as each of the vertically arranged resistive elements or heat spots.

Obviously, heat will be lost through conduction much faster below the level of the fluid within the tank, as a consequence of the higher heat capacity of the fluid, than it will above the fluid level as a consequence of the much lower heat capacity of the gas or void within the storage tank—the heat capacity of the wall of the storage tank being the same in any location and therefore permissible to be ignored for the purposes of the present invention.

Provided that the distance between the heating elements is greater than the thickness of the material of the storage tank, then the differential cooling rates of heat elements above and below the fluid level within the storage tank will come into play, and the differential rates of loss or increase of resistivity due to cooling will be detectable, so that it will be possible to make a reasonable approximation of the fluid level within the storage tank.

By employing a plurality of resistive elements each of which has a high positive or negative temperature coefficient, and each of which is such that as its entrained heat decreases due to heat loss because of conduction, its electrical resistance reduces or increases, and provided that it is possible to sample the voltage at the junction between each adjacent pair of resistive elements, then as a consequence of the network connection of resistive elements functioning effectively as a voltage divider, an approximation of the fluid level within the storage tank will be determined.

Typically, but not necessarily, the resistive elements are such as to have a positive temperature coefficient, whereby their resistance value increases as they are heated. Also, typically, but not necessarily, the network of resistive elements is such that they are connected in series.

It follows also that the size of the resistive elements must be greater than the thickness of the wall of the storage tank, as well as the spacing between the resistive elements. This is so as to provide sufficient heat to the immediate area or region where the resistive element is located, so as to raise the local temperature at that location significantly above ambient temperature.

Obviously, the invention as it has so far been described will function quite well with a series of thermisters. They may be first heated and thereby function as power resistors, and then measured until such time as the cooling rates of the thermisters separate them into two groups, a fast cooling group which is below the fluid level within the storage tank, and a slow cooling group which is above the fluid level within the storage tank, as mentioned above.

However, thermisters are expensive elements, and may require significant power in order to be heated in the first instance. That may require, therefore, a reasonably significant capital cost in respect of the provision of a plurality of thermisters and the provision of a power source sufficient to supply heating power to the thermisters to heat them up.

A further provision of the present invention, however, comes as a consequence of the unexpected discovery that a number of resistive inks are available which will meet the requirement of a resistive element having a high temperature coefficient, so that resistive elements can be effectively printed using resistive inks. Thus, if the resistive elements are connected with low resistivity conductive elements between them, then a high electric current which is passed through the resistive elements will cause the elements to become heated, and their resistance to increase or decrease; but when a low electric current is passed through them after they are heated then their heat will be given up through heat conduction as discussed above, and their resistance will decrease or increase, depending on whether they have a positive temperature coefficient or a negative temperature coefficient.

From all of the above, it follows that relatively little resolution is required to determine the fluid level within a storage tank, and an approximation is quite sufficient because a decision whether or not to refill the storage tank after any procedure to determine the fluid level within that storage tank has been carried out is made when necessary, over a relatively broad percentage of depletion of the stored fluid within the tank.

The provision of apparatus in keeping with the present invention is made easier as a consequence of the relatively low cost and ease of programming of microprocessors. In other words, a microprocessor can be provided and programmed so as to periodically cause a level detection procedure to occur, or to respond to a remote requirement for the level detection procedure to be undertaken. During the lengthy periods of time between level detection procedures, there is very little power demand by the microprocessor on the power supply, so that sleep mode consumption of battery power is effectively irrelevant in terms of calculation of expected battery life.

If an area of the resistive ink is applied to a suitable substrate, such as polyaramide, where the substrate functions effectively as a flexible printed circuit having copper between the resistive lands created by the areas of resistive ink, then a very simple level detector in keeping with the present invention may be provided that can simply be adhered to the outer wall of a storage tank. It will be appreciated that the thermal resistance of a thin layer of adhesive will be small compared to that of the material of storage tanks—usually steel. Moreover, the electronics by way of a microprocessor and control circuitry and the like, can be bonded directly to the substrate, so that the only other element which is required is a power supply which will typically comprise a battery pack. Thus, the provision and maintenance of level detectors in keeping with the present invention may be effected quite easily and economically.

SUMMARY OF THE INVENTION

To that end, therefore, the present invention provides a level detector for storage tanks for fluids which comprises a power source, a microprocessor, a plurality of resistive elements connected in a network across the power source, and a plurality of conductive elements joining the resistive elements in that network.

In use, the plurality of resistive elements are attached to the side wall of the storage tank over the height thereof where the level of the fluid within the storage tank is expected to vary over time, so that at least the approximate level of fluid in the storage tank may be detected from time to time.

Each of the resistive elements has a high temperature coefficient so that when a high electric current is passed through it, its resistance changes significantly from a first resistance value towards a second resistance value, and the resistive element becomes heated. When a low electric current is passed through the series connection of resistive elements after they have been heated, their resistance returns from their second resistance value towards their first resistance value, as their heat is given up through heat conduction.

The power source is adapted to provide both a high voltage and a low voltage across the network of resistive elements.

The spacing between adjacent pairs of resistive elements is greater than the thickness of the wall of the storage tank to which the resistive elements are attached.

The microprocessor is adapted to control the power source so as to switch it from a high voltage operation to a low voltage operation after a predetermined heating period.

Also, the microprocessor is further adapted to periodically measure the voltage at each of the conductive elements in the network and to store and analyse the voltage at each conductive element over a period of time.

Thus, after a series of measurements of the voltages of the conductive elements has been taken and analysed, while the resistive elements are giving up heat through conduction to the wall of the storage tank to which they are attached, an adjacent pair of resistive elements can be identified wherein the resistance of a first resistive element of the pair is decreasing at a greater rate than the resistance of a second first resistive element of that pair, due to the increased heat conductance away from the lower resistive element. Therefore, an approximation of the fluid level within the storage tank can be made, because it will be at or in the immediate region of the specific pair of resistive elements where the differing rate of change of the resistance values of the resistive elements has been determined.

In general, the network of resistive elements comprises the plurality of resistive elements being connected in series.

However, the network of resistive elements may also be connected in parallel.

Moreover, the resistance value of each of the plurality of resistive elements may such that it increases as a high electric current as passed through them.

On the other hand, the resistance value of each of the plurality of resistance elements may be such that it decreases as a high electric current is passed through them.

Typically, the level detector of the present invention further comprises a signalling means for communicating data to a remote location.

Thus, after an approximation of the fluid level within a storage tank has been made, data which are indicative of that approximation are sent to a remote location.

In one embodiment of the present invention, the resistive elements may be thermisters.

In a further embodiment of the present invention, the level detector will comprise a substrate on which the resistive elements and the microprocessor are placed, so that the substrate together with the power source and the remote signalling means may be adhered as a unitary identity to the wall of a storage tank.

In that case, typically the resistive elements are areas of resistive ink that have been applied to the substrate, and the conductive elements between them are areas of low resistance which is also applied to the substrate.

The power source comprises at least two batteries that are connected in series as to provide high voltage, together with a switch means which is adapted to by-pass at least one of least two batteries so as to provide low voltage from a remaining battery.

More generally put, however, the power source may be such that it is adapted to provide high power to the network of resistive elements during a heating cycle thereof, and to provide low power to the network of resistive elements during a measurement cycle thereof.

Typically, the low resistivity material between resistive elements is copper.

The microprocessor and signalling means may be adapted to at least periodically test the voltage level of the power source and to send a signal to a remote location when the voltage level falls below a predetermined voltage level.

Typically, when a substrate is employed on which various elements of the present invention are mounted, that substrate is polyaramide

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 5:
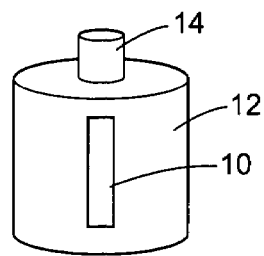
FIG. 5 illustrates the placement of a level detector in keeping with the present invention on a storage tank.

Referring first to FIG. 5, a level detector 10 is shown, in a general manner, as being attached or placed onto the external wall of a storage tank 12. The storage tank 12 has a re-filler apparatus 14. It will be understood that the storage tank 12 is made from a material which has some heat conductance capability, typically steel. Typically, in keeping with the purposes of the present invention, the storage tank 12 is located at a remote site. It will be obvious, of course, that the present invention is equally applicable to any location where there may be a multiplicity of storage tanks for fluids, such as in a tank farm, where each individual storage tank may be individually polled as to the level of fluid in that specific storage tank at any instant in time.

Figure 1:
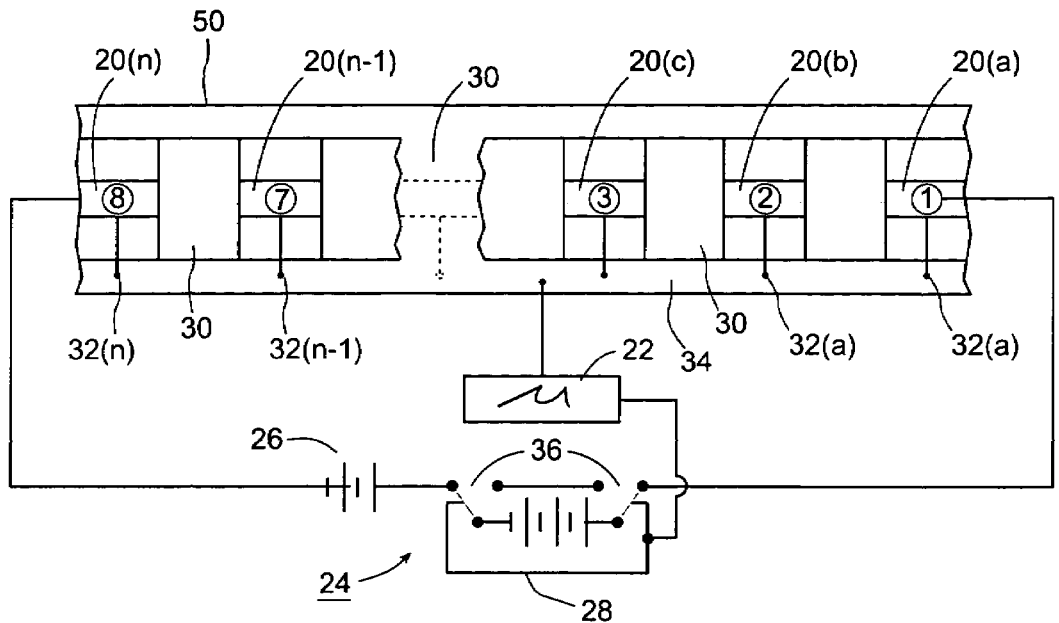
FIG. 1 is a schematic view a typical circuit in keeping the present invention.

The level detector 10 is shown schematically in FIG. 1. The principal components of the level detector comprise a plurality of resistive elements 30.

Typically, for purposes of the resolution that it is generally required for level detectors in keeping with the present invention, and so as to economize in respect of the size and computing power of the microprocessor 22, there are eight resistive elements 30 which are employed.

It will be noted that the connection between the resistive elements 30, as indicated in FIG. 1, is such that they are connected in series. However, it is well known to those skilled in the art that a parallel connection will function as well as a series connection of resistive elements, with a voltage divider being capable of being detected in the manner described hereafter, provided that each of the resistive elements 30 is placed vertically one above the other for purposes of measurement and approximation of the liquid level within a storage tank 12.

A power supply 24 is provided. The precise details of the power supply 24 are beyond the scope of the present invention, and in any event would be well known to those skilled in the art. However, it will be noted that the power supply is such that it will provide both a high voltage and a low voltage, depending on the requirements of the circuit of the level detector, and the time sequence of the level detection procedure, as described hereafter.

Thus, it will be seen in FIG. 1 that a plurality of resistive elements 30 is arranged in series, and has a plurality of conductive elements 20(a), 20(b), . . . 20(n-1), 20(n), located between them in the series connection across the power supply 24.

As indicated in FIG. 5, the level detector 10 is placed on the storage tank 12 in a location over the height thereof where the level of fluid within the storage tank 12 is expected to vary over time.

As explained above, the principle of the present invention is to provide a plurality of resistive elements connected in a network, where each resistive element has a high temperature coefficient so that when a high power source is applied to them their resistance will either increase or decrease, and at the same time they will become heated. However, when a power source is applied to them, after they are heated, their resistance will decrease or increase as their heat is given up through heat conduction. Since the level detector is attached to the wall of the storage tank, the heat conduction will vary as a consequence particularly of the placement of the resistive elements—whether they are adjacent to the fluid or liquid within the storage tank or whether they are adjacent to the gas in the void area above the fluid within the storage tank 12.

The arrangement shown in FIG. 1 is a simple one, and functions as a consequence of Ohm's Law. Thus, for a given series connection of resistive elements, current will vary as voltage, or current will vary as resistance for a constant voltage.

Accordingly, an arrangement is made by way of example only in FIG. 1 to provide two batteries 26 and 28 in series connection one with another, together with a ganged switch 36. Operation of the ganged switch 36, under the control of the microprocessor 22, will place either the battery 26 or the series connection of the battery 26 together with the battery 28 across the series connected level detector circuit comprising the series connected resistive elements 30 having the conductive elements 20 between them.

Thus, when a high voltage is placed across the series connection, a high current will pass through the resistive elements 30, and they will be heated.

After a suitable period of time, typically five seconds to sixty seconds, the heating of the resistive elements 30 will have been concluded, and their resistance will have increased or decreased. Then, the low voltage power source comprising only the battery 26 is placed across the series connection, so that only a low current is passed through the resistive elements 30 and the conductive elements 20 therebetween.

However, the microprocessor 22 is arranged so as to measure the voltage at each of the conductive elements at sample points $32(a)$, $32(b)$... $32(n-1)$, $32(n)$, as they are seen on a bus 34.

Obviously, conductive element $20(a)$ is at the top end of the level detector 10 as it is located as shown in FIG. 5, with conductive element $20(n)$ being at the low end of the level detector 10.

Figure 2:
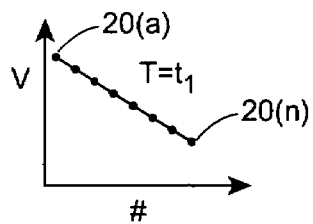
FIGS. 2, 3 and 4 are a series of graphs showing the effect of sampling over a period of time, so as to provide an approximation of fluid level.
Figure 3:
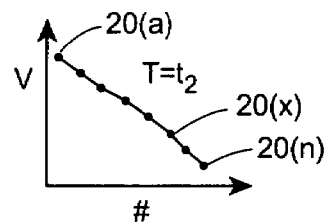
Figure 4:
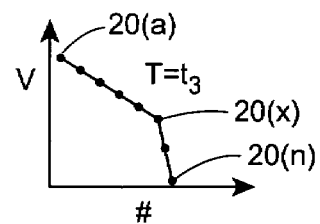

FIGS. 2, 3, and 4, illustrate the effect of voltage measurements made by the microprocessor 22 at each of the conductive elements 20, over a period of time. Immediately after the low voltage power source from such as battery 26 is switched on, the voltage from element $20(a)$ to $20(n)$ will be sampled, and will be such as shown in FIG. 2. This is almost a straight line, because the resistance of each of the resistive elements 30 will be nearly identical, and the thus the voltage will reduce directly as the number of elements increases at each voltage sample point 32.

It will be understood that, in fact, the resistance elements which are vertically oriented so as to be below the level of the fluid within the storage tank 12 will, immediately after the low power measurement cycle is commenced, be cooler than those resistance elements above the fluid level within the storage tank 12, due to the difference in the rate of heat lost due to conduction. Initially, the actual amount of heat lost will be quite low as compared with later during the measurement cycle, so that a "knee" will start to develop between a pair of resistance elements such that the resistance value of one of the resistance elements of that pair decreases at a greater rate than the resistance value of the other of the resistance elements of that pair.

However, over a short period of time, the "knee" will increase in the voltage trace, as shown in FIG. 3, at sample point $20(x)$ as indicated in FIG. 3. That sample point is between an adjacent pair of resistive elements where the loss of heat and therefore the change of resistance will be greater due to heat conduction on the lower of the elements of that pair, because it is adjacent to the fluid or liquid within the storage tank 12. The upper resistive element of that pair will be losing its heat less quickly as a consequence of heat conduction, because there is a gas or void behind it within the storage tank 12, and therefore its resistance value will change less quickly.

Over a further period of time, a voltage curve will appear as shown in FIG. 4, with a very specific knee having been developed and analysed by the microprocessor 22. Having determined that the resistive pair is that which is at either side of the conductive element $20(x)$, an approximation of the fluid level within the tank 12 has now been made. That approximation can then be sent from the level detector 22 by a signalling means (not shown) associated with the microprocessor 22. The nature of the signalling means is beyond the scope the present invention, and might comprise a network connection to the Internet, a mobile telephone, an R.F. link, and so on.

The operation of the microprocessor will be well known to those skilled in the art. Typically, an analogue to digital converter is provided with or included in the microprocessor 22, and it will perform all of the necessary data processing functions that are required, and the analysis that is required, to develop curves such as those shown in FIGS. 2, 3, and 4 in its own memory and so as to determine the pair of resistive elements where the knee $20(x)$ has occurred.

Thus, it can be appreciated that a relatively close approximation of the fluid level within the storage tank can be achieved on a periodic basis under the control of the microprocessor 22, or on demand from a remote location to the microprocessor 22.

As noted above, the resistive elements 30 may be thermisters. However, thermistors may be expensive and may require relatively large power supplies, but they will function in keeping with the present invention.

However, the present invention specifically provides for a further alternative whereby the entire level detector 10 is placed on a substrate 50. Typically, the substrate is polyaramide, a material which is used in flexible printed circuits. Accordingly, there will also be a copper layer placed on the substrate 50.

More particularly, the resistive elements 30 may comprise a resistive ink which is such that it has a high temperature coefficient, and is such that when a high electric current passes through the resistive ink its resistance increases or increase; but when a low electric current is passed through the resistive ink after it has been heated its resistance will decrease or increase as heat is given up through conduction.

By placing the resistive elements 30, the conductive elements 20, the microprocessor 22, and even the power supply 24, on a substrate 50, then the entire level detector 10 may be placed onto the wall of a storage tank 12 as a unitary entity, as indicated in FIG. 5.

The microprocessor 22 may also be programmed so as to work with its signalling means to "wake up" and test the voltage level of the power source 24. If the voltage level decreases below a predetermined level, then a signal to that effect will be sent from the signalling means to a remote location.

It will be seen that the series connection of resistive elements 30 functions effectively as a voltage divider so as to derive the curves shown in FIGS. 2, 3, and 4, over time, which may be easily analysed by the microprocessor 22.

As noted above, it is also obvious to those skilled in the art that a parallel network of resistive elements 30 may be energized as described above, and scanned as described above, with the effect of a voltage divider once again being detectable as a consequence of the greater heat loss and therefore the greater change of resistance of the resistive elements which are located below the fluid level within the tank.

A level detector for storage tanks for storage fluids has been described where an approximation of the fluid level within the storage tank can be made, which is sufficient particularly when the storage tank is located at a remote site. This precludes the necessity for attendance at the remote site to determine the fluid level within the storage tank, and it precludes the necessity for complicated float and valve arrangements, and the like.

It has been noted that various resistive elements including thermisters and resistive inks may be employed, and that a simple and inexpensive microprocessor together with a relatively small power source may be provided.

For example, the power source 24 may comprise a plurality of AA alkaline cells, which function over a wide range of ambient temperatures, and which are very inexpensive to replace.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A level detector for storage tanks for fluids, comprising: a power source, a microprocessor, a plurality of resistive elements connected in a network across said power source, and a plurality of conductive elements joining said resistive elements in said network;
   wherein, in use, said plurality of resistive elements are attached to the side wall of a storage tank over the height thereof where the level of fluid within the storage tank is expected to vary over time, so that at least the approximate level of fluid in the storage tank may be detected from time to time;
   wherein said resistive elements have a high temperature coefficient whereby when a high electric current is passed through them their resistance changes significantly from a first resistive value towards a second resistive value, and they become heated; and when a low electric current is passed through them after they are heated their resistance returns from their second resistance value towards their first resistive value, and their heat is given up through heat conduction;
   wherein said power source is adapted to provide a high voltage and a low voltage across said network of resistive elements;
   wherein the spacing between adjacent pairs of said resistive elements is greater than the thickness of the wall of the storage tank to which said resistive elements are attached;
   wherein said microprocessor is adapted to control said power source to switch from said high voltage operation to said low voltage operation after a predetermined heating period;
   wherein said microprocessor is further adapted to periodically measure the voltage at each of said conductive elements in said network and to store and analyze the voltage at each said conductive element over a period of time; and
   wherein the resistance value of each of said plurality of resistive elements decreases as a high electric current is passed through them,
   whereby after a series of measurements of the voltages of said conductive elements has been taken and analyzed, while said resistive elements are giving up heat through conduction though the wall of the storage tank to which they are attached, an adjacent pair of resistive elements can be identified wherein the resistance of the lower resistive element of said pair is decreasing at a greater rate than the resistance of the upper resistive element of said pair due to increased heat conductance away from said lower resistive element, so as to provide an approximation of the fluid level within said storage tank.

2. A level detector for storage tanks for fluids, comprising: a power source, a microprocessor, a plurality of resistive elements connected in a network across said power source, and a plurality of conductive elements joining said resistive elements in said network;
   wherein, in use, said plurality of resistive elements are attached to the side wall of a storage tank over the height thereof where the level of fluid within the storage tank is expected to vary over time, so that at least the approximate level of fluid in the storage tank may be detected from time to time;
   wherein said resistive elements have a high temperature coefficient whereby when a high electric current is passed through them their resistance changes significantly from a first resistive value towards a second resistive value, and they become heated; and when a low electric current is passed through them after they are heated their resistance returns from their second resistance value towards their first resistive value, and their heat is given up through heat conduction;
   wherein said power source is adapted to provide a high voltage and a low voltage across said network of resistive elements, said power source comprising at least two batteries which are connected in series to provide said high voltage, together with switch means adapted to by-pass at least one of said at least two batteries to provide said low voltage from a remaining battery;
   wherein the spacing between adjacent pairs of said resistive elements is greater than the thickness of the wall of the storage tank to which said resistive elements are attached;
   wherein said microprocessor is adapted to control said power source to switch from said high voltage operation to said low voltage operation after a predetermined heating period; and
   wherein said microprocessor is further adapted to periodically measure the voltage at each of said conductive elements in said network and to store and analyse the voltage at each said conductive element over a period of time;
   whereby after a series of measurements of the voltages of said conductive elements has been taken and analysed, while said resistive elements are giving up heat through conduction through the wall of the storage tank to which they are attached, an adjacent pair of resistive elements can be identified wherein the resistance of the lower resistive element of said pair is decreasing at a greater rate than the resistance of the upper resistive element of said pair due to increased heat conductance away from said lower resistive element, so as to provide an approximation of the fluid level within said storage tank.

3. A level detector for storage tanks for fluids, comprising: a power source, a microprocessor, a plurality of resistive elements connected in a network across said power source, a plurality of conductive elements joining said resistive elements in said network, and signaling means for communication data to a remote location;
- wherein, in use, said plurality of resistive elements are attached to the side wall of a storage tank over the height thereof where the level of fluid within the storage tank is expected to vary over time, so that at least the approximate level of fluid in the storage tank may be detected from time to time;
- wherein said resistive elements have a high temperature coefficient whereby when a high electric current is passed through them their resistance changes significantly from a first resistive value towards a second resistive value, and they become heated; and when a low electric current is passed through them after they are heated their resistance returns from their second resistance value towards their first resistive value and their heat is given up through heat conduction;
- wherein said power source is adapted to provide a high voltage and a low voltage across said network of resistive elements;
- wherein the spacing between adjacent pairs of said resistive elements is greater than the thickness of the wall of the storage tank to which said resistive elements are attached;
- wherein said microprocessor is adapted to control said power source to switch from said high voltage operation to said low voltage operation after a predetermined heating period;
- wherein said microprocessor is further adapted to periodically measure the voltage at each of said conductive elements in said network and to store and analyze the voltage at each said conductive element over a period of time; and
- wherein said microprocessor and said signaling means are further adapted to at least periodically test the voltage level of said power source and to send a signal to a remote location when said voltage level falls below a predetermined level;
- whereby after a series of measurements of the voltages of said conductive elements has been taken and analyzed, while said resistive elements are giving up heat through conduction though the wall of the storage tank to which they are attached, an adjacent pair of resistive elements can be identified wherein the resistance of the lower resistive element of said pair is decreasing at a greater rate than the resistance of the upper resistive element of said pair due to increased heat conductance away from said lower resistive element, so as to provide an approximation of the fluid level within said storage tank.

4. A level detector for storage tanks for fluids, comprising: a power source, a microprocessor, a plurality of resistive elements connected in a network across said power source, and a plurality of conductive elements joining said resistive elements in said network, signaling means for communicating data to a remote location, and a substrate on which said resistive elements and said microprocessor are placed;
- wherein, in use, said substrate, said power source, and said remote signaling means are attached as a unit to the side wall of a storage tank over the height thereof where the level of fluid within the storage tank is expected to vary over time, so that at least the approximate level of fluid in the storage tank may be detected from time to time;
- wherein said resistive elements have a high temperature coefficient whereby when a high electric current is passed through them their resistance changes significantly from a first resistive value towards a second resistive value, and they become heated; and when a low electric current is passed through them after they are heated their resistance returns from their second resistance value towards their first resistive value, and their heat is given up through heat conduction;
- wherein said power source is adapted to provide a high voltage and a low voltage across said network of resistive elements;
- wherein the spacing between adjacent pairs of said resistive elements is greater than the thickness of the wall of the storage tank to which said resistive elements are attached;
- wherein said microprocessor is adapted to control said power source to switch from said high voltage operation to said low voltage operation after a predetermined heating period; and
- wherein said microprocessor is further adapted to periodically measure the voltage at each of said conductive elements in said network and to store and analyze the voltage at each said conductive element over a period of time;
- whereby after a series of measurements of the voltages of said conductive elements has been taken and analyzed, while said resistive elements are giving up heat through conduction though the wall of the storage tank to which they are attached, an adjacent pair of resistive elements can be identified wherein the resistance of the lower resistive element of said pair is decreasing at a greater rate than the resistance of the upper resistive element of said pair due to increased heat conductance away from said lower resistive element, so as to provide an approximation of the fluid level within said storage tank, and further whereby data indicative of the fluid level approximation are sent to a remote location by said signaling means.

5. The level detection of claim 4, wherein said substrate is polyaramide.

6. The level detector of claim 4, wherein said resistive elements are areas of resistive ink applied to said substrate, and said conductive elements are areas of low resistivity material applied to said substrate.

7. The level detector of claim 6, wherein said low resistivity material is copper.

* * * * *